STATIC MEMORY SYSTEM

Original Filed May 8, 1952 2 Sheets-Sheet 1

INVENTOR
ISAAC L. AUERBACH
BY
Fidler, Crouse & Beardsley
ATTORNEYS

INVENTOR
ISAAC L. AUERBACH
BY
Fidler, Crouse & Beardsley
ATTORNEYS

United States Patent Office 2,928,080

Patented Mar. 8, 1960

2,928,080

STATIC MEMORY SYSTEM

Isaac Levin Auerbach, Philadelphia, Pa., assignor to Burroughs Corporation, Detroit, Mich., a corporation of Michigan Continuation of application Serial No. 286,693, May 8, 1952. This application July 16, 1958, Serial No. 749,032

31 Claims. (Cl. 340—174)

This invention relates generally to memory systems and more particularly to a system comprising storage devices wherein the non-linear characteristics of magnetic materials are utilized to effect the storage.

The present application is a continuation of applicant's copending application Serial No. 286,693, which was filed on May 8, 1952.

Because of a growing need for rapid and accurate answers to complex problems in accounting, military, and other fields, a large amount of research and development has been carried on for the purpose of developing computing systems and apparatus capable of handling such problems. Practically all computing systems or apparatus of this type require storage means into which information may be entered and from which information may be extracted quickly and readily. Such storage means should, in addition to being capable of rapid functioning, also be reliable and, in many instances, compact. A desirable characteristic of a memory device is an ability to store information over varying lengths of time, and even retain the information in the absence of continued application of power. Further, it is highly desirable to reduce the amount of maintenance necessary as much as possible.

In the prior to art, there are known several kinds of storage or memory systems such as electromagnetic systems utilizing relays, electronic systems utilizing vacuum tubes and/or gas tubes, and mechanical systems of various types. Non-magnetic electrical systems that utilize vacuum tubes or gas tubes present design problems because of the fact that the characteristics of the electronic tubes and other circuit elements may vary considerably with ageing and usage. Electromagnetic systems utilizing relays and mechanical systems include mechanically movable members which limit the speed of operation thereof both with respect to entry and extraction of information. After a certain amount of usage the inherent difficulties of contact erosion and wear of moving parts begin to present increasingly greater maintenance problems with respect to relays. A fast reliable storage system of compact design requiring a minimum amount of maintenance and having stable operating characteristics substantially unchanged with wear and age and capable of retaining stored information even in the event of a power supply failure and shutdowns would, therefore, mark a definite improvement in the field of memory devices.

An object of this invention is to provide a high speed memory device having no moving parts.

Another object of the invention is to provide a novel memory device capable of retaining stored information independently of applied power.

Another object of the invention is to provide a novel magnetic storage system utilizing a minimum number of electronic discharge devices.

Another object is to provide a memory system whose operating characteristics remain substantially unchanged regardless of the length of time used and the amount of usage.

Still another object is to provide a novel high speed storage system utilizing bistable memory devices such as magnetic elements which are reliable in operation and requiring a minimum amount of maintenance.

Another object is to provide a novel and simple high speed memory device wherein the storage is effected by static magnetic elements actuated by means of electric discharge devices and requiring a small number of discharge devices as compared with the number of storage elements.

A more specific object of the invention is to provide a novel storage system wherein a plurality of magnetic storage elements are arranged in a coordinate array of columns and rows, selectively operable actuating means associated with each column and row whereby information may be read into a particular storage element in the array by simultaneously operating the actuating means for that column and that row wherein the particular storage element is located, and readout means including actuating means for each column of devices for simultaneously conditioning all the elements of that particular row to cause these elements to produce on outputs individual to each row an indication of the information stored therein. Although this arrangement is described as an array of rows and columns, it is to be understood that this designation is chosen merely to facilitate an explanation of the electrical interconnection of the storage elements and does not intend to limit the invention to any particular physical arrangement.

In accordance with one embodiment of the invention a plurality of magnetic cores are arranged in a rectangular coordinate array to form a plurality of columns and a plurality of rows. A plurality of first means are individually associated with each of the rows to selectively condition the cores of each of the rows to have a negative or a positive remanence in accordance with the particular code to be stored in the associated row of the memory system. A plurality of second means causes a selected column of cores to have a positive or negative remanence in accordance with the conditioning by the first plurality of means. One each of the plurality of second means is individual to each of the columns of cores. The operation of the plurality of second means completes the entry of the information to be stored into the storage mechanism. A plurality of third means each individual to each of the columns, when operated, causes all the cores in a selected column of cores to acquire a remanence of the same given polarity. The polarity of the remanence of only certain cores of the selected row will be affected by the operation of the plurality of third means. Those cores affected will be in accordance with the conditioning of the cores in the preselected rows by the plurality of first means. A plurality of fourth means each individual to one of the rows of cores is adapted to detect a change of remanence from one polarity to another polarity when a preselected one of the plurality of third means is operated. Thus, the operation of the plurality of third means is in effect a read out mechanism for the information stored in said storage mechanism. The same information extracted from the storage device can be reentered into the storage device by well known external storage mechanism such as, for example, an electronic bistable circuit with complementing circuitry if necessary.

In carrying out the invention each of the above mentioned cores has a first and a second winding wound thereon. The first plurality of first means places a potential on the first terminal of the first windings of the cores in a row in accordance with the particular information to be entered. The plurality of second means then causes a particular potential to be impressed on the other terminals of the first windings of a preselected column of cores in such a manner that current is caused to flow only through certain of the first windings of the selected column in accordance with the information being entered therein by the first plurality of means. Consequently, only the cores whose associated first windings have current flow therethrough will have the polarity of its remanence changed. Read out is accomplished by the plurality of the third means which cause a current to flow through all the second windings of the selected column of cores. Only those cores in which the polarity of the remanence changes at this time will have a voltage induced in the first winding of the associated core. This induced voltage in the first windings is detected by the plurality of fourth means transmitted through external circuitry where needed.

Another feature of the invention is the use of the magnetic core to store a bit of information so that even though a power failure may occur, the remanence of the magnetic core will not be altered and the information stored therein at the time of the power failure will still be there when power is restored.

These and other objects and advantages of the present invention will be more fully understood from the following detailed description of an illustrated embodiment thereof taken together with the accompanying drawings, wherein.

Figure 1:
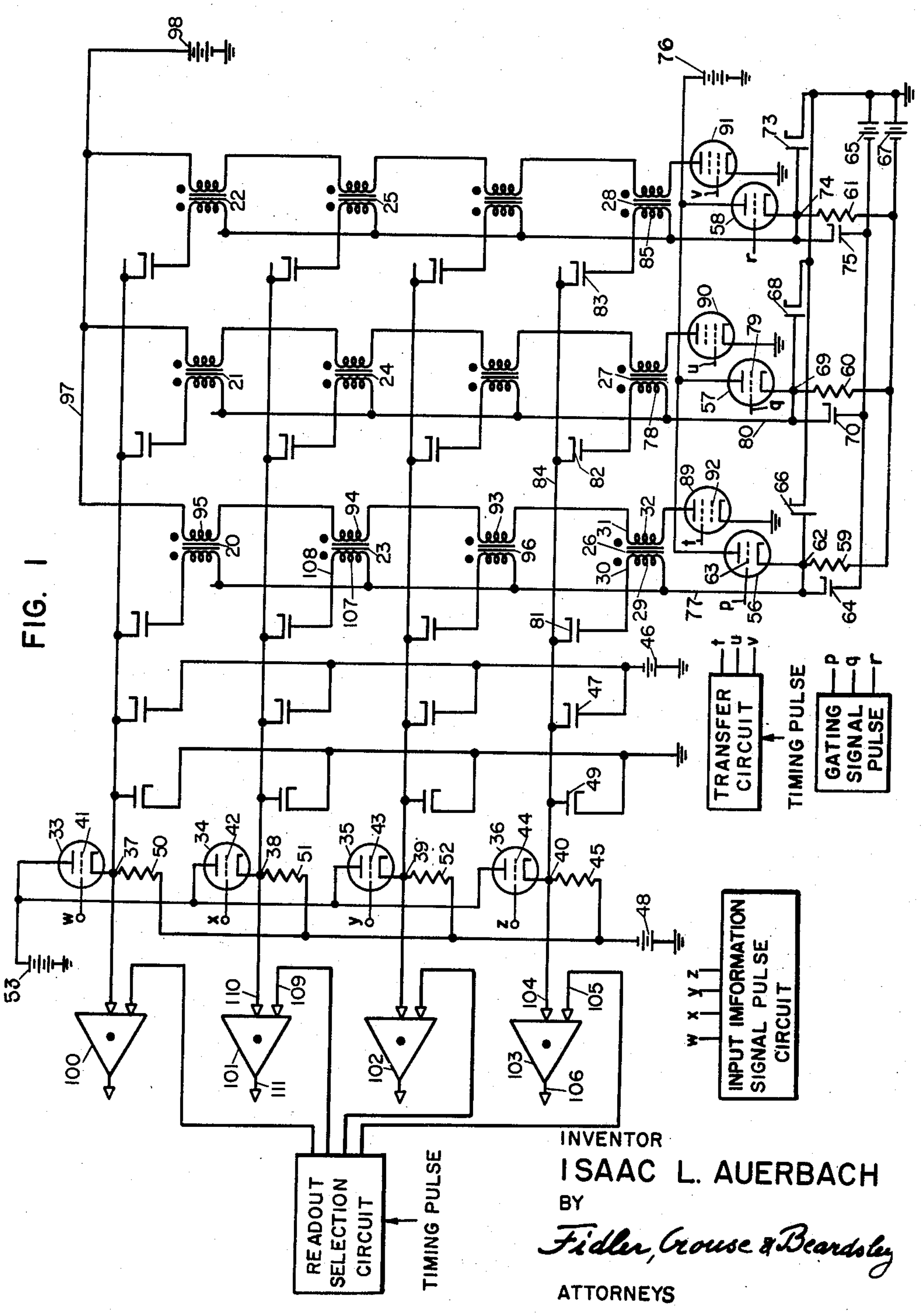
Figure 1 is a schematic circuit diagram of the invention.

Referring now to the schematic circuit diagram in Fig. 1, the invention is shown as comprising a plurality of magnetic storage devices arranged in a coordinate array of rows and columns. The cores of these magnetic devices are preferably made from a magnetic material, commonly referred to as rectangular hysteresis loop material, which is characterized by having a high residual flux density and having a ratio of remanence flux density to saturation flux density which approaches unity. Many types of nickel-iron alloys have such characteristics when properly cold rolled and heat treated, and the magnetic material known as Deltamax and manufactured by Allegheny Ludlum Steel Corporation, Pittsburgh, Pennsylvania, is particularly well suited for the present invention.

There are shown by way of example twelve magnetic storage devices in Fig. 1 arranged in four rows of three devices in each and in three columns of four devices in each, the rows being designated as being horizontal in the drawing and the columns as being vertical. Storage devices 20, 21 and 22 makes up the first row, devices 23, 24 and 25 the second row and devices 26, 27 and 28 the last row.

Each of the devices comprises two windings wound on the core thereof. In Fig. 1 the dot notation defines the winding polarities in the standard manner, that is to say, current flowing into the dotted terminal of a winding of a given core will induce a current which will flow out of the dotted terminal of the other winding. Thus winding 29 of core 26, for example, has terminal 30 thereof designated with a dot and terminal 31 of the winding 32 is also designated with a dot. A current flowing into terminal 30 and through winding 29 will induce a current in winding 32 which will flow out of terminal 31.

Each of the magnetic cores will, after having been magnetized substantially to its saturation point in either direction by magnetizing current flowing through one of its windings, have a residual magnetism therein only slightly less than the saturation flux when the magnetizing current is cut off and will remain in this magnetic state until a reversing magnetizing current is applied thereto. By designating each of the two polarities of residual flux as representing one of the two digits of the binary code, each magnetic device may be utilized to store information in a binary form. Thus by assigning each column of devices collectively to form a word in the binary code, the storage system illustrated in Fig. 1 will have a capacity to store simultaneously three four-digit binary words. By increasing the rows and columns this capacity can, of course, be increased as desired. In the following example it will be assumed that binary information is stored in the respective columns in successive order of importance with the arithmetically least important binary digits stored in one of the devices 20, 21 and 22, and the arithmetically most important digits being stored in the corresponding one of the devices 26, 27 and 28.

In the storage system shown in Fig. 1 there is provided one vacuum tube for the magnetic devices of each row in order to prepare or condition all of the devices in each of the rows to assume a negative or a positive remanence in accordance with the particular binary information to be stored, such information being applied in the form of voltage signals at the respective grids of these vacuum tubes, and one vacuum tube for each column of devices for causing a selected column to accept the binary information applied to the row vacuum tubes. Thus vacuum tubes 33, 34, 35 and 36 are provided for the respective four rows of devices beginning from the top of the drawing. The tubes are shown as being of the triode type having a plate, a cathode and a control grid. They are connected in cathode follower circuits which have a common D.C. plate voltage supply and in which the respective cathodes are connected to terminals 37, 38, 39 and 40 of the respective rows so as to establish a potential thereon in accordance with the information to be entered into the system.

In a cathode follower circuit the voltage of the cathode will vary proportionally with the plate current, and if a voltage pulse applied to the control grid is designated as representing one digit of the binary code and the absence of a voltage pulse being designated as representing the other digit, the resulting voltages on the cathode will indicate the binary information applied to the grid. In the present illustrative embodiment of the invention a positive voltage pulse applied to the grids 41, 42, 43 and 44 of the tubes 33 to 36, respectively, causing a corresponding increase in voltages of the respective cathodes and terminals 37 to 40 will be taken as indicating the binary digit "0" and the absence of a pulse leaving the voltage of the cathodes at their normal quiescent level as indicating the binary digit "1."

In order to limit the voltages of the cathodes to certain predetermined maximum and minimum values suitable for operating the storage system there is provided voltage limiting means connected to each of the terminals. Inasmuch as the voltage limiting means for the terminals 37 to 40 are identical, only the one associated with terminal 40 will be described in detail. Terminal 40, which is electrically connected to the junction between the cathode resistor 45 of tube 36 and the cathode thereof, is connected through an asymmetrical device 47 to the negative terminal of a D.C. voltage source such as a storage battery 46. The cathode of the asymmetrical device 47 is connected to terminal 40 and the anode thereof is connected to the negative terminal of battery 46 so that it will be non-conductive when terminal 40 is more positive than the negative terminal of battery 46, but will conduct current when the potential on terminal 40 tends to become more negative than the negative terminal of this battery. For proper operation of the circuit the potential of the negative terminal of battery 48 to which cathode resistor 45 is connected should be substantially more negative than the potential of the negative terminal of battery 46. In order to limit the positive potential of terminal 40 to substantially ground potential there is provided an asymmetrical device 49 whose anode is connected to this terminal and whose cathode is connected to ground. The voltages of terminals 37, 38 and 39 associated with cathode resistors 50, 51 and 52 of tubes 33, 34 and 35, respectively, are limited in identical fashion. The tubes, the operating voltages therefor and the associated circuit components are preferably selected so that terminals 37 to 40 will tend to assume a voltage substantially more negative than the lower limiting potential of the limiting circuit in the absence of an information pulse, and a voltage substantially above ground potential when an information pulse is applied to the grid of the associated tube even when the emission of the tube has fallen off by an appreciable amount due to ageing, for example, thus increasing the useful life of the tube.

Assume that the system is designed so that terminals 37 to 40 are required to be at a potential of approximately negative 15 volts in the absence of an information pulse and at ground potential when a positive voltage is applied to the grid of the associated tube. Tubes 33 to 36 may then be of the type 5687 manufactured by Tung Sol Electric Company located in the State of New Jersey, cathode resistances 50, 51, 52 and 45 may be of 5000 ohms, batteries 46 and 48 may be of 15 and 105 volts, respectively, anode potential of the tubes may be supplied by a 105 volt battery 53, and the asymmetrical devices in the limiting circuit may be germanium rectifiers having a forward impedance of approximately 100 ohms and a backward impedance of approximately 80,000 ohms.

Tubes 56, 57 and 58 are provided for causing simultaneously all of the magnetic storage devices shown in Fig. 1 as being in vertical alignment therewith, respectively, for accepting information imparted to tubes 33 to 36. Tubes 56 to 58, therefore, gate such information through the diode gate circuits (such as diode 81) into the magnetic devices of their respective columns. These tubes are connected in cathode follower circuits which may be identical with the cathode follower circuits of tubes 33 to 36 and described above and are provided, respectively, with cathode resistors 59, 60 and 61. Terminal 62 is electrically connected to the cathode of tube 56 and the voltage thereof will vary in accordance with the voltage applied to control grid 63. A voltage limiting circuit such as described above is provided for each of the terminals connected to the cathodes of tubes 56 to 58. The lower or most negative voltage limit of terminal 62 is established by the connection of an asymmetrical device 64 to the negative terminal of a battery 65 and the upper voltage limit is established by the connection of an asymmetrical device 66 to ground. Asymmetrical device 64 is connected so as to conduct current when the potential on terminal 62 tends to become more negative than that of the negative terminal of battery 65, and asymmetrical device 66 is connected so as to conduct current when terminal 62 tends to become more positive than ground potential. The cathode resistors 59 to 61 are connected to the common negative terminal of battery 67.

The voltage limiting circuitry associated with each of tubes 57 and 58 is identical with that associated with tube 56. Thus asymmetrical device 68 is connected between ground and output terminal 69 of tube 57 and asymmetrical device 70 is connected between this terminal and the negative terminal of battery 65 and, similarly, asymmetrical device 73 is connected between ground and terminal 74 of tube 58 and asymmetrical device 75 is connected between this terminal and the negative terminal of battery 65. It will be apparent that the function of asymmetrical devices 68 and 73 is identical to that of device 66 and the function of devices 70 and 75 is identical to that of device 64.

The voltage limiting circuitry for each of output terminals 62, 69 and 74 of tubes 56 to 58, respectively, is arranged and functions in exactly the same manner as the voltage limiting circuitry for output terminal 40 of tube 36 and a detailed explanation thereof is therefore not deemed to be necessary. The common D.C. plate voltage supply for tubes 56, 57 and 58 may be a 105 volt storage battery 76. The potentials of batteries 67 and 65 may be the 105 volts and 15 volts, respectively, in which case the tubes 56, 57 and 58 may be of the same type as tubes 33 to 36 and the cathode resistors may each be of 5000 ohms resistance.

The control grids of tubes 56, 57 and 58 are connected to a source of pulses, not shown, adapted to apply a positive pulse to a selected one of the grids to cause the associated tube to become conducting. In the absence of a pulse on one of these control grids such as grid 63 of tube 56, the associated output terminal 62 will tend to assume a potential substantially more negative than 15 volts negative, but will be prevented from doing so because of current flow through asymmetrical device 64 from the negative terminal of 15 volt battery 65. The positive pulse applied to grid 63 is of such magnitude as to tend to cause the potential of terminal 62 to rise substantially above ground potential but is prevented from doing so because of current flow through asymmetrical device 66 to ground.

The output terminals of tubes 56 to 58 are connected to one side of one of the windings of all the magnetic storage devices in the column associated with the particular tube. Thus terminal 62 of tube 56 is connected to the lower terminal of winding 29 of magnetic device 26 through a lead 77 and to a corresponding point of the corresponding windings of all of the devices in the same column. Similarly, output terminal 69 of tube 57 and output terminal 74 of tube 58 are connected to one side of the corresponding windings of all of the magnetic devices in the associated column. The other terminal of each of these windings is connected through an asymmetrical device to the output terminal of the associated one of tubes 33 to 36. Thus magnetic device 26 is in the row with which tube 36 is located and terminal 30 of winding 29 thereof is connected to the output terminal 40 through asymmetrical device 81. Generalizing, it may thus be said that each magnetic device has one winding electrically connected across the output terminals of the tubes associated with the row and column in which the device is located. Asymmetrical device 81 and the corresponding asymmetrical devices in the other rows are connected so as to permit current flow through the winding connected in circuit therewith only when the output terminal of the associated tube of that particular column is more positive than the tube of that particular row.

There is also provided means for simultaneously causing a current flow through one winding of each of the magnetic devices located in a common column. This means is illustrated in Fig. 1 as being vacuum tubes 89, 90 and 91. Each of these tubes has connected in the plate circuit thereof one winding of each of the magnetic devices which are located in a common column. Referring specifically to tube 89 associated with the left hand column, this tube is provided with a control grid 92 for selectively causing a current flow therethrough, a cathode connected to ground potential, and an anode connected to one end of series connected windings 32, 93, 94 and 95 of magnetic devices 26, 96, 23 and 20, respectively. The other end of the series connected windings is connected by means of a lead 97 to a source of positive potential such as a battery 98. Tubes 90 and 91 are similarly connected in circuit with one of each of the windings of the second and third columns of devices, respectively. Tubes 89, 90 and 91 are advantageously of the constant current type such as tetrodes or pentodes. Tubes such as manufactured by the Tung Sol Electric Co. of New Jersey and distributed under the type number 5881 may be used in the described embodiment.

Gate circuits generally indicated at 100, 101, 102 and 103 are provided for the respective rows to serve as output circuits for the magnetic storage devices located therein. Each gate circuit has a signal input terminal connected to the output terminal of the corresponding row of magnetic devices and a trigger input terminal for opening the gate when a positive pulse is applied thereto from a source of timing pulses, not shown. Taking gate circuit 103, for example, it is provided with a signal input terminal 104 connected to output terminal 40 of tube 36 associated with the lowest row of magnetic devices, an input terminal 105 for having applied thereto from a source of pulses, identified in Fig. 1 as Readout Selection Circuit, a timing pulse for opening the gate, and an output terminal 106 for connection to a utilization apparatus. Gate circuits which will permit the transmission of a signal pulse when a timing pulse is applied thereto are well known in the art and a detailed description thereof is not, therefore, deemed to be necessary.

The circuit described is particularly suitable for accepting binary information, storing such information indefinitely in the magnetic storage devices and for reading out the information to the gate circuits when desired. It will be evident that the coordinate system shown may be expanded so as to store binary items having any number of digits and to store any number of different items of information within the physical limits of the components used.

It is well known that every kind of information may be expressed in the binary code but for the sake of illustration it will be assumed that it is desired to store a four-digit binary number. Each of the rows of the coordinate array is assigned to one of the orders of the number and in the present illustration it will be assumed that the rows are assigned to the respective orders in accordance with their increasing arithmetical significance from top toward bottom. Thus the binary digits of the least arithmetical significance will be applied, in the form of voltage pulses, to the grid 41 of tube 33, and the digits of increasing significance to successive ones of the grids of tubes 34, 35 and 36.

For the sake of illustration it will be assumed that the application of a positive potential to the grids of the tubes 33 to 36 will represent the binary digit "0" and the absence of an applied positive potential will represent the binary digit "1." From the above description of the cathode follower circuits comprising these tubes and the voltage limiting circuits associated with the output terminals thereof, it will be evident that such terminals will be at a potential determined by source 46, or a negative 15 volts in the described embodiment, when a binary digit "1," i.e. absence of a positive pulse, is imparted to the associated tube but will rise to ground potential when a binary digit "0," i.e. the application of a positive pulse, is imparted thereto.

It was mentioned above that the cores of the magnetic devices are made of a material having a high remanence flux to saturation flux ratio and this property is utilized to store binary information therein. Thus residual magnetism of one polarity is taken to represent one binary digit and residual magnetism of the other polarity to represent the other binary digit.

In the following description of the operation of the system described it will be assumed that current flow through the windings corresponding to winding 29 of the magnetic device 26 which results when the lower terminal is more positive than the upper terminal will establish a positive flux in the associated core. It will also be assumed that current flow through the windings which are connected in the plate circuit of one of the tubes 89 to 91 resulting when the associated tube is caused to conduct will cause the associated core to become negatively magnetized. Referring specifically to magnetic device 26, the core thereof will be magnetized in a positive sense when output terminal 62 of tube 56 is more positive than output terminal 40 of tube 36 thereby causing a magnetizing current to flow through column bus 77 to winding 29 and asymmetrical device 81 and then through the row bus to gate circuit 103. When this magnetizing current is terminated, the core will be in a state of positive residual magnetism herein designated as its binary digit "1" state. It should be noted that current is prevented from flowing through winding 29 in the opposite direction by asymmetrical device 81. When a current is caused to flow through winding 32 by applying a positive potential to grid 92 of tube 89 to render this tube conductive, this current will magnetize the core in a negative sense and reverse the magnetism thereof if it was previously in a state of positive magnetization. Thus by applying a positive pulse to the grid of one of the tubes 89 to 91 a current will be caused to flow through the windings of the magnetic devices in the column with which the particular tube is associated to cause all the magnetic devices in this column to become negatively magnetized to substantial saturation. Very little change in flux will take place in the magnetic devices which had a digit "0" stored therein and thus already were in a state of negative residual magnetization inasmuch as the cores, when made from the rectangular hysteresis loop material mentioned above, will have substantially the same flux density when they are in a maximum residual magnetic condition as when they are in a substantially saturated magnetic condition of the same polarity. The flux in the cores of the magnetic devices which had a digit "1" stored therein and whose cores therefore were in a state of maximum positive residual magnetism will change to substantially saturated negative condition and this will induce a voltage in the other winding thereof.

The operation of the circuit will now be described. Generally speaking, the information to be stored in the system expressed in the binary code is simultaneously applied to the respective control grids of tubes 33 to 36, the binary digit "0" as a positive pulse and the digit "1" as the absence of a pulse. During at least a portion of the time that such binary code information is applied to the control grids of these tubes, a positive gating pulse is applied to the grid of the one of tubes 56 to 58 associated with the particular column wherein it is desired to store the information. The cores of the magnetic devices of that particular column will then be placed in a state of magnetization in accordance with the binary information imparted to tubes 33 to 36 and will remain therein in the form of residual magnetism until it is desired to extract this particular information. Other items of information may then be stored in other columns of the system within the capacity thereof. The information is extracted from a particular column by applying a positive pulse to the control grid of the associated one of tubes 89 to 91 and, simultaneously therewith, opening all of the gates 100 to 103 by applying a potential to the terminal thereof corresponding to terminal 105 of gate 103. Simultaneously with the extraction of information from a column all the magnetic devices in that column will be placed in their "0" position, i.e., in a state of maximum negative residual magnetism, and will be in condition to accept a new item of information.

The manner in which the circuit functions to provide the result stated above will be described in terms of the operation of a single magnetic storage device when binary information in the form of the digit "0" and the digit "1" is stored therein and extracted therefrom. It will be understood that before a binary information is entered into a particular column this column should be in a "cleared" condition with all of the magnetic devices in that column in "0" condition, that is, with the cores thereof in a state of maximum negative remanence.

Assume that the left-hand column is in a cleared condition and that it is desired to read a binary digit "1" into the magnetic core 26. The binary digit "1" which in the illustrated embodiment is represented by the absence of a signal pulse is applied to grid 44 of tube 36. It was pointed out above that with no signal applied to the grid 44 the cathode and hence output terminal 40 will be held to substantially 15 volts negative by 15 volt battery 46. During at least a portion of the time that the signal is applied to grid 44, a positive potential is applied to the grid 63 of tube 56 to increase the plate current and therewith increase the drop across cathode resistor 59 so as to raise the potential of output terminal 62 from a negative potential of 15 volts to ground potential. The potential of output terminal 62 of tube 56 will thus be 15 volts more positive than output terminal 40 of tube 36 and a current will flow through winding 29 and through asymmetrical device 81 which is poled so as to conduct current flow in that direction. The asymmetrical device thus serves as a blocking device until an unblocking pulse is applied to grid 63 to raise the potential of its cathode to ground potential. Inasmuch as the cathode follower circuit associated with tube 36 is designed so that the output terminal 40 thereof will tend to go considerably more negative than a negative 15 volts but is prevented from doing so by battery 46 connected therethrough through asymmetrical device 47, the current flow through winding 29 and through cathode resistor 45 will be insufficient to raise the potential of terminal 40 above 15 volts negative while the flux in the core is changing and thus causing this winding to have a high impedance. The flow of current through winding 29 will be sufficient to magnetize the core of magnetic device 26 to substantial saturation in a positive sense and after the magnetizing current has been cut off by removing the positive potential on the grid of tube 56 the core will remain in maximum positive remanence condition until power is applied thereto to reverse the magnetism thereof. It will be noted that asymmetrical devices 82 and 83 will prevent current from flowing back through the windings of magnetic devices 27 and 28.

Assume that it is also desired to read a binary digit "0" into magnetic device 23. It will be recalled that in the present embodiment information represented by the binary digit "0" is imparted to the system in the form of a positive voltage pulse and will be applied to the grid 42 of tube 34 to increase the current flow therethrough and increase the voltage drop across cathode resistor 51 to a point where the cathode will tend to rise above ground potential but is prevented from doing so by the asymmetrical device connecting the cathode to ground. When during at least a portion of the time that the signal is applied to grid 42 the potential on output terminal 62 of tube 56 is raised to ground potential by the application of an unblocking voltage pulse to grid 63, there will be no potential drop between terminals 62 and 38 and hence no current will flow through the associated winding of magnetic device 23. The core of magnetic device 23 will therefore remain in its previous state of maximum negative remanence to store a binary digit of "0."

Assume next that it is desired to extract the binary information from the magnetic devices 23 and 26 and to produce an indication of the stored information on the output leads from gate circuits 101 and 103 and at the same time clear the column in which these devices are located. A positive potential is applied to the grid 92 of tube 89 associated with this column to cause a plate current to flow through this tube and through series connected windings 32, 93, 94 and 95 of magnetic devices 20, 23, 96 and 26, respectively. This current will be in such a direction as to magnetize in a negative sense all of the cores to which these windings are coupled and, because of the high remanence flux density to saturation flux density ratio of the cores, very little change in flux will take place in the core of device 23 inasmuch as this core is in a state of maximum negative residual flux. Only a small voltage will therefore be induced in winding 107. The flux in the core 26, however, will change from maximum positive residual flux condition to a negative substantially saturation flux and will induce a substantial voltage across winding 29 of such polarity that terminal 30 thereof will be positive with respect to the other terminal which is held at the potential of terminal 62, i.e., 15 volts negative. The voltage induced in winding 29 will cause a current to flow through asymmetrical device 81 and cathode resistor 45 to the negative terminal of battery 48. This current will increase the potential across resistor 45 to raise the potential of terminal 40 to substantially ground potential. Substantially simultaneously with the application of the read-out pulse applied to the grid of tube 89 there is applied a positive pulse to terminals 105 and 109 of gates 103 and 101, respectively. Input terminal 104 of the gate 103 will be at the same potential as terminal 40 and will therefore produce an output signal at the output 106 of the gate. Output terminal 38 of tube 34 will remain at its normal level of a negative 15 volts and the timing pulse 109 opening the gate 101 will cause no output signal at the output 111 of this gate. It will thus be evident that the magnetic device 26 wherein the binary digit "1" was stored will produce an output signal at the output of gate 103 and magnetic device 23 in which a binary digit of "0" was stored will produce no output signal at the output of its associated gate 101.

Figs. 2 to 6 show the time relationship of the electrical conditions in various parts of the circuit during the described illustrated cycle of operation wherein binary digits of "0" and "1" were stored in and extracted from the magnetic devices 23 and 26, respectively, taking the read-in part of the cycle as being initiated at time 10 microseconds and the read-out part of the cycle as being initiated at time 25 microseconds.

Figure 2:
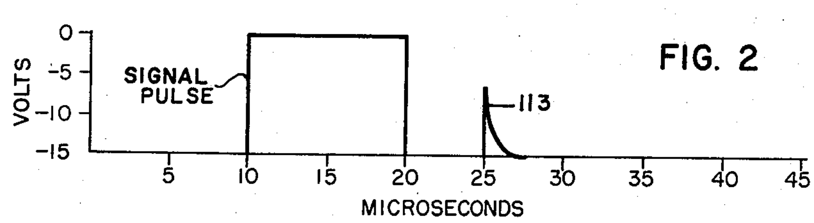
Figs. 2 to 6 illustrate typical current and voltage conditions at various points in the circuit during a complete cycle of operation.
Figures 3, 4, 5:
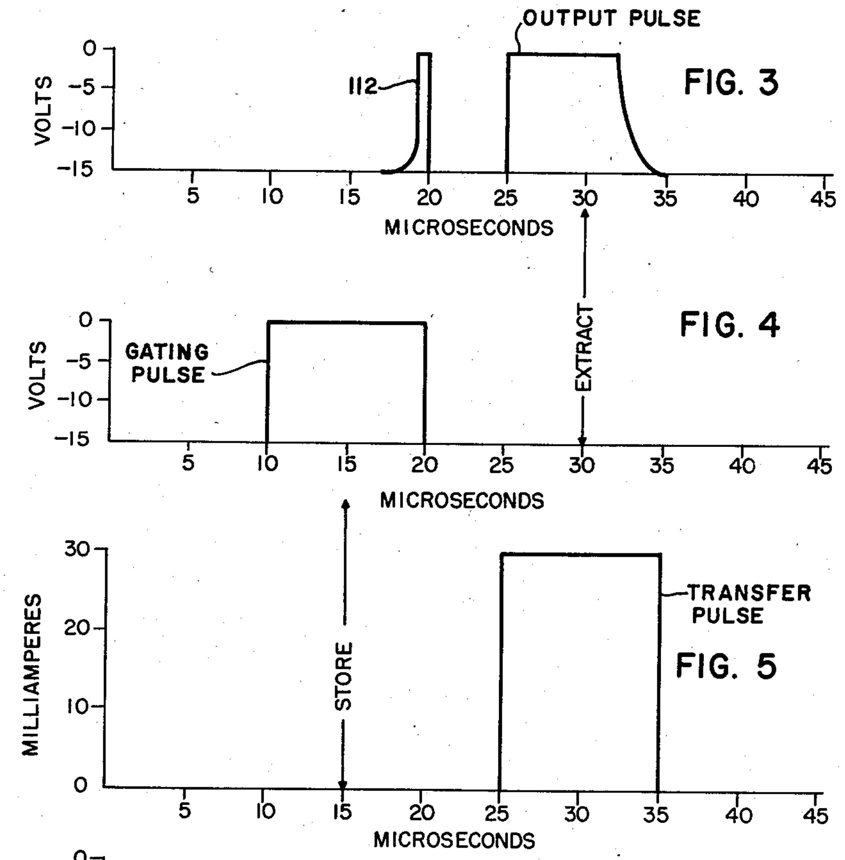

Fig. 2 shows the voltage changes on output terminal 38 of tube 34. The signal voltage applied to grid 42 will cause the voltage of the cathode thereof and terminal 38 to increase to ground potential almost instantaneously at time 10 microseconds and to remain there until time 20 microseconds when the signal pulse is terminated. The voltage on terminal 62 of tube 56 will also rise almost instantly to ground potential from its normal potential of 15 volts negative when a positive gating or unblocking pulse is applied to grid 63 thereof at time 10 microseconds and will remain there until the pulse is terminated at time 20 microseconds, as shown in Fig. 4. No signal voltage was applied to grid 44 of tube 36 to increase the current flow through this tube and terminal 40 will therefore remain at a potential of negative 15 volts as shown in Fig. 3 during the period the flux in the core of magnetic device 26 is reversing due to the current flow from terminal 62 through winding 29 to terminal 40. About time 18 microseconds the flux in this core will have been reversed and the impedance of winding 29 will rapidly decrease to a point where it will permit sufficient current to flow therethrough and through cathode resistor 45 to raise the potential of terminal 40 to ground potential for a relatively short period of time. It is important that sufficient time be provided to allow the core of device 26 to become substantially saturated in a positive sense and the appearance of a pulse 112 such as shown at time 18 microseconds in Fig. 3 indicates that this has been accomplished. At time 20 the signal pulses are terminated and the cores of magnetic devices 23 and 26 will be in a state of negative and positive residual magnetism respectively.

Figure 6:
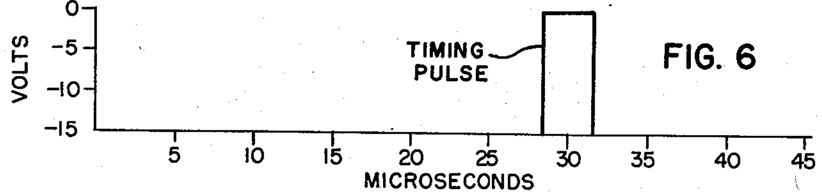

The read-out or transfer pulse is taken as being applied to grid 92 of tube 89 at time 25 microseconds and will produce a current pulse as shown in Fig. 5 to flow through windings 32, 93, 94 and 95 for a length of time, here shown as 10 microseconds, sufficient to bring all of the cores associated with these windings to substantially negative saturation. It was pointed out above that the flux in the core of magnetic device 23 will change very little as it is changed from maximum negative remanence to substantially negative saturated condition and will produce, on terminal 38, only a small voltage pulse 113 which will have terminated by about time 27 microseconds as shown in Fig. 2. The flux in the core of magnetic device 26, in changing from its state of maximum positive remanence to substantially negative saturation, will induce a voltage in winding 29 which will raise the voltage of terminal 40 to ground potential from time 25 microseconds to about time 32 microseconds when the rate of change of flux in this core will rapidly decrease as the core approaches negative saturation as shown in Fig. 3. It will thus be noted that from time 27 microseconds to time 32 microseconds, terminal 38 will remain at a potential of 15 volts negative and terminal 40 will remain at ground potential. If the timing pulses for the gates 101 and 103 are applied to these gates at time, say, 28 microseconds as shown in Fig. 6, to raise the potential of terminals 109 and 105 to ground potential for a duration of about five microseconds, a corresponding pulse will appear on output terminal 106 of gate 103 but no output pulse will, of course, appear on output terminal 111 of gate 101.

While only a single embodiment of the invention has been described and illustrated, it will be apparent to those skilled in the art that various modifications of the circuit elements shown, as well as in the arrangement and values thereof may be made, and the capacity of the memory system may be increased as desired without departing from the spirit and scope of the invention.

I claim:

1. A memory system comprising a plurality of magnetic cores having an initial state of magnetic remanence of a given polarity and a second state of magnetic remanence of a second polarity arranged in a rectangular coordinate manner to form a plurality of rows and a plurality of columns, a first means to individually prepared each row of cores to receive a positive or a negative remanence, a second means adapted to individually cause each core of a given column to obtain a positive or a negative remanence in accordance with the preparation of each row by said first means, and third means adapted to cause each of said cores in a given preselected column to acquire said initial remanence to produce an output signal in said first means in response to flux changes in said cores from said second state to said initial state of magnetic remanence caused by said third means.

2. A memory system comprising a plurality of magnetic cores capable of assuming positive and negative bistable states of magnetic remanence arranged in a rectangular coordinate manner to form a plurality of columns and a plurality of rows, each of said cores having a first winding and a second winding wound thereon, each of said first and said second windings having a first and second terminal, a plurality of first means associated with the said first terminals of said first windings to individually and selectively prepare each row of cores to have a positive remanence or a negative remanence, a plurality of second means connected to the said second terminals of said first windings to individually and selectively cause each column of cores to have a remanence of a positive or negative polarity in accordance with the preparation of each row of cores by said first plurality of means, a plurality of control means connected to the said second terminals of said second windings operable to individually and selectively cause all of said cores in a given column to acquire a remanence of a given polarity, and a plurality of gating means each individually connecting the said first winding of the cores in a given row and adapted to transmit output voltages detected by said first winding when one of said control means is operated to cause a change in magnetic state from one polarity to the other in associated ones of said magnetic cores.

3. A memory system in accordance with claim 2 in which said plurality of first means comprises a voltage source having first and second operating levels of potential, said first level of potential being adapted to cause current flow through a given first winding of the associated row when the associated one of said plurality of second means is operated, and the said second level of potential being adapted to prevent current flow through said given first winding of the associated row when the associated one of said plurality of second means is operated.

4. A memory system in accordance with claim 2 in which said plurality of second means each comprises a voltage source having first and second operating levels of potential, said first level of potential existing to cause said associated column to be in a non-selected condition, and said second level of potential existing to cause said associated column to be in a selected condition to cause current to flow through selected windings of the said first windings of said selected column in accordance with the conditioning of the said first windings by the said plurality of first names.

5. A memory system in accordance with claim 2 in which said first plurality of means each comprises a voltage source having first and second operating levels of potential, said first level of potential being adapted to cause current flow through a given first winding of the associated row when the associated one of said second plurality of means is operated, and the said second level of potential being adapted to prevent current flow through a given first windings of the associated row when the associated one of said second plurality of means is operated and in which said plurality of second means comprises a voltage source having substantially said first and second operating levels of potential, said first level of potential of each of said second means existing when the associated one of said plurality of second means is in a non-operated condition, and the said second level of potential of each of said plurality of second means existing when the associated one of said plurality of second means is in an operated condition, and a plurality of asymmetrical devices each individual to said plurality of first windings, each of said asymmetrical devices connecting the first terminal of each of said first windings to that one of said plurality of first means associated with the row containing said first winding in such a manner as to prevent a low impedance to current flow from said plurality of second means to said plurality of first means.

6. A plurality of magnetic cores capable of assuming bistable states of magnetic remanence arranged in a rectangular coordinate array to form a plurality of columns and a plurality of rows, each of said cores having a first winding and a second winding similarly wound thereon, each of said plurality of first and second windings having corresponding first and second terminals, a plurality of first voltage source means each individually associated with said plurality of rows, a plurality of first asymmetrical devices connected to said first terminal of each of said first windings with the associated one of said plurality of first voltage source means, a plurality of second voltage source means each individually connected with one each of said plurality of columns, each of said plurality of second voltage source means being connected to all of the said second terminals of said first windings of the associated column, means associated with each of said pluralities of first and second voltage source means causing said voltage source means to selectively assume a first or second potential level, the said plurality of first voltage source means each selectively assuming said first or second level of potential in accordance with information presented thereto, each of said plurality of second voltage source means assuming said second potential level when the associated column is selected to have the information presented by the plurality of said first voltage source means stored therein, and each of said plurality of second voltage source means assuming said first potential when the associated column potential is not selected to have the said information stored therein, and a plurality of control means individually associated with one each of said columns, each of said plurality of control means being electrically connected to all of said second windings of the associated columns, energizing means to selectively energize each of said plurality of said control means to cause a current to flow through the said second windings of the column associated with the selected one of said plurality of control means and a plurality of detecting means each individually associated with one of said rows of first winding means and adapted to detect an induced voltage in the associated first windings when a selected one of said plurality of control means is energized.

7. A memory device in accordance with claim 6 in which each of said plurality of first voltage source means and said means associated therewith comprise a cathode follower circuit, each of said cathode follower circuits comprising an electronic discharge device having an anode, a control grid, and a cathode, and a resistance connected to each of said cathodes, a second asymmetrical device connected to the said cathode limiting the lower level of potential of said cathode to said first potential, and a third asymmetrical device connected to said cathode limiting the upper level of said potential of said cathode to said second potential level.

8. A memory device in accordance with claim 6 in which said plurality of second voltage source means and said means associated therewith comprise a cathode follower circuit, each of said cathode follower circuits comprising an electron discharge device having an anode, a control grid, and a cathode, and a resistance connected to said cathode, a second asymmetrical device connected to said cathode limiting the lower potential of said cathode to that of said first potential level, and a third asymmetrical device connected to said cathode limiting the upper level of potential of said cathode to the potential of said second potential level, said cathode being further connected to the said second terminals of the first windings of the associated column.

9. A memory device in accordance with claim 6 in which each of said plurality of said first voltage source means and each of said plurality of said second voltage source means comprise a cathode follower circuit, each of said cathode follower circuits comprising an electron discharge device having an anode, a control grid, and a cathode, and a resistance connected to said cathode, a second asymmetrical device connected to said cathode to limit the lower level of potential of said cathode to said first potential level and a third asymmetrical device connected to said cathode to limit the upper level of potential of said cathode to said second potential level, the cathodes associated with each of said plurality of said first voltage source means being connected to all the cathodes of the said first asymmetrical devices in the associated row, and the said cathode of the electron discharge devices associated with each of said plurality of said second voltage sources being connected to the said second terminals of said first windings of the associated columns.

10. A memory device in accordance with claim 6 in which said magnetic cores are of a magnetic material having a substantially rectangular hysteresis loop characteristic and having a positive remanence and a negative remanence, the condition of positive remanence in a given core representing a stored binary bit of information of "1" and a condition of negative remanence in a given core representing a stored binary bit of information of "0".

11. A memory system comprising a plurality of storage elements capable of assuming bistable remanent storage states arranged in an array of rows and columns, means for preparing the elements to receive information by setting them to an initial remanent state, individual gating circuits coupled to individual elements of the rows, and a read-in circuit connected to said gating circuits comprising means for selectively applying gate selection voltages to said gating circuits to open signal flow paths through the elements of predetermined ones of the rows for a predetermined period in response to a first signal without disturbing the storage state of the storage elements, and means for selectively establishing signal flow through said paths opened by said read-in circuit and those included elements along predetermined columns during said period in response to a second signal.

12. A system as defined in claim 11 wherein the gating circuits are diode rectifier devices provided in the signal flow paths.

13. In a magnetic core matrix memory system comprising a plurality of static magnetic storage cores capable of assuming bistable states of magnetic remanence arranged in an array of rows and columns having separate cores at separate row and column coordinates including means for introducing information for storage in said cores of the system, means for reading information out of said cores including means for producing an output pulse from each row of the matrix memory system, and means for sampling the output pulse comprising a gate responsive to coincidence of the output pulse and a timing pulse, and means for delivering a timing pulse to the gate for sampling the output pulse within a time range commencing a period of time after the inception of the output pulse and terminating a period of time before the end of the output pulse.

14. In a matrix memory system comprising a plurality of static magnetic storage cores capable of assuming bistable states of magnetic remanence arranged in an array of rows and columns having separate cores at separate row and column coordinates, means for reading information selectively into said storage cores by establishing them in one or the other of said bistable states of magnetic remanence of one polarity or the other, means for reading information out of said cores by switching the magnetic state from said one bistable remanent state to magnetic saturation in the opposite sense of polarity thereby causing the cores to present a signal output pulse during the switching period, and by switching the magnetic state from the other bistable remanent state to saturation in the same sense of polarity thereby producing a relatively short spurious pulse, and means for gating the output pulse to a utilization circuit during an intermediate portion of the switching period and after the termination of the relatively short spurious pulse.

15. In a matrix memory system comprising a plurality of static magnetic storage cores capable of assuming bistable states of magnetic remanence arranged in an array of rows and columns having separate cores at separate row and column coordinates, means including windings for reading information selectively into said storage cores by establishing them in one or the other of said bistable states of magnetic remanence of one polarity or the other, means for reading information out of said cores by switching the magnetic state from said one bistable remanent state to magnetic saturation in the opposite sense of polarity thereby causing the cores to present a signal output pulse across said windings during the switching period, and by switching the magnetic state from the other bistable remanent state to saturation in the same sense of polarity thereby producing a relatively short spurious pulse, and means for gating the output pulse across said windings to a utilization circuit during an intermediate portion of the switching period and after the termination of a relatively short spurious pulse.

16. A memory system comprising a plurality of storage elements capable of assuming bistable remanent storage states arranged in an array of rows and columns, wherein such storage elements are magnetic cores, means for preparing the elements to receive information by setting them to an initial remanent state, individual gating circuits coupled to individual elements of the rows, and a read-in circuit connected to said gating circuits comprising means for selectively applying gate selection voltages to said gating circuits to open signal flow paths through the elements of predetermined ones of the rows for a predetermined period in response to a first signal without disturbing the storage state of the storage elements, and means for selectively establishing signal flow through said paths opened by said read-in circuit and those included elements along predetermined columns during said period in response to a second signal.

17. A memory system comprising a plurality of storage elements capable of assuming an initial and a second remanent storage state arranged in an array of rows and columns, individual gating circuits coupled to individual elements of the rows, read-in circuit means connected to said gating circuits comprising means for selectively applying gate selection voltages to said gating circuits to open signal flow paths through the elements of predetermined ones of the rows for a predetermined period in response to a first signal without disturbing the storage state of the storage elements, means for selectively establishing signal flow through said paths opened by said read-in circuit and those included elements along predetermined columns during said period in response to a second signal and thus causing the storage elements in said opened paths to acquire one of said remanent storage state in accordance with the gate selection voltages applied by said read-in circuit means, and read-out means for causing predetermined ones of said storage elements to reacquire said initial remanent state to produce an output signal in response to storage state changes in said element caused by said read-out means.

18. An information storage system as set forth in claim 17, wherein each of said gating means comprises an asymmetrical conducting device.

19. A memory system comprising a plurality of storage elements capable of assuming first and second remanent storage states arranged in an array of rows and columns, a plurality of row busses, a plurality of column busses, means for electrically interconnecting different ones of a first group of said storage elements between one of said row busses and different ones of said column busses and for electrically interconnecting different ones of a second group of said storage elements between a second one of said row busses and different ones of said column busses for establishing a signal flow path for each such interconnection, gating circuit means electrically connected in each of said signal flow paths for blocking signal flow therealong, read-in circuit means connected to each of said row busses for applying preparatory voltages thereto for a predetermined period in response to a first signal, which voltages by themselves do not change the storage state of the storage elements, means for selectively applying a gate selection voltage to at least one of said gating circuits for unblocking predetermined ones of the signal flow paths during said period in response to a second signal and thus causing the storage elements in said predetermined paths to acquire one of said remanent storage state in accordance with the preparatory voltages applied to the row busses by said read-in circuit means, and read-out means for causing predetermined ones of said storage elements to reacquire said first remanent state to produce an output signal on said row busses in response to storage state changes in said elements caused by said read-out means.

20. A memory system comprising a plurality of storage elements capable of assuming first and second remanent storage states arranged in an array of rows and columns, a plurality of row busses, a plurality of column busses, means for electrically interconnecting different ones of a first group of said storage elements between one of said row busses and different ones of said column busses and for electrically interconnecting different ones of a second group of said storage elements between a second one of said row busses and different ones of said column busses for establishing a signal flow path for each such interconnection, individual gating circuits electrically connected to individual storage elements in each of said signal flow paths for blocking signal flow therealong, read-in circuit means connected to each of said row busses for applying preparatory voltages thereto for a predetermined period in response to a first signal, which voltages by themselves do not change the storage state of the storage elements, means for selectively applying a gate selection voltage to at least one of said gating circuits for unblocking predetermined ones of the signal flow paths during said period in response to a second signal and thus causing the storage elements in said predetermined paths to acquire one of said remanent storage state in accordance with the preparatory voltages applied to the row busses by said read-in circuit means, and read-out means for causing predetermined ones of said storage elements to reacquire said first remanent state to produce an output signal on said row busses in response to storage state changes in said elements caused by said read-out means.

21. A memory system comprising a plurality of storage elements capable of assuming first and second remanent storage states arranged in an array of rows and columns, a plurality of row busses, a plurality of column busses, means for electrically interconnecting different ones of said storage elements between one of said row busses and different ones of said column busses and for electrically interconnecting different ones of a second group of said storage elements between a second one of said row busses and different ones of said column busses for establishing a signal flow path for each such interconnection, gating circuit means electrically connected in each of said signal flow paths for blocking signal flow therealong, read-in circuit means connected to each of said row busses for applying preparatory voltages thereto for a predetermined period in response to a first signal, which voltages by themselves do not change the storage state of the storage elements, means for selectively applying a gate selection voltage to at least one of said gating circuits for storing said preparatory voltages in the storage elements of a selected column, said last-mentioned means unblocking the signal flow paths which include said selected column elements during said period in response to a second signal and thus causing the storage elements in said column to acquire one of said remanent storage states in accordance with the preparatory voltages applied to the row busses by said read-in circuit means, and read-out means for causing predetermined ones of said storage elements to reacquire said first remanent state to produce an output signal on said row busses in response to storage state changes in said elements caused by said read-out means.

22. A memory system comprising a plurality of storage elements having bistable remanent storage states one of which is a reference state, said storage elements being arranged in an array of rows and columns, first voltage means, first coupling means for selectively applying preparatory voltages from said first voltage means to the elements of certain of the rows, second voltage means, second coupling means for applying voltages from said second voltage means to the elements of a selected one of the columns to cause each of said storage elements in the selected column to assume one or the other of its storage states in accordance with whether or not said storage elements have been prepared by the application of preparatory voltages from said first voltage means, third voltage means, third coupling means for applying voltages from said third voltage means to the elements of a selected one of the columns to cause said storage elements in the selected column to assume said reference remanent state, and gating means individually coupled to each of said rows and adapted to deliver output voltages produced when said storage elements in the selected column change their storage state from the other of said remanent states to said reference remanent state.

23. A memory system comprising a plurality of storage elements having bistable remanent storage states one of which is a reference state, said storage elements being arranged in an array of rows and columns, first voltage means, first coupling means for selectively applying preparatory voltages from said first voltage means to the elements of certain of the rows, second voltage means for applying voltages to the storage elements of a selected one of the columns to cause each of said storage elements in the selected column to assume one or the other of its storage states in accordance with whether or not said storage elements have been prepared by the application of preparatory voltages from said first voltage means, read-out means for applying interrogating signals to the elements of a selected one of the columns at a time distinct from the application of the voltage from said second voltage means, said interrogating signals being of sufficient magnitude to cause said storage elements in the selected column to assume said reference remanent state, and gating means individually coupled to each of said rows for delivering output voltages produced when said storage elements in the selected column change their storage state from the other of said remanent states to said reference remanent state.

24. A memory system comprising a plurality of bistable storage elements operable to either an initial or a second storage state and being in said initial state, said storage elements being arranged in an array of rows and columns, a plurality of row busses, a plurality of column busses, individual asymmetrically conducting devices connected electrically in series with each of said storage elements, means for electrically interconnecting different ones of a first group of said serially connected asymmetrically conducting devices and storage elements between one of said row busses and different ones of said column busses and for electrically interconnecting different ones of a second group of said storage elements between a second one of said row busses and different ones of said column busses for establishing a signal flow path for each such interconnection, read-in circuit means connected to each of said row busses for applying preparatory voltages thereto for a predetermined period in response to a first signal, which voltages by themselves do not change the storage state of the storage elements, means for selectively applying a selection voltage to a predetermined one of said column busses for establishing current flow through the asymmetrically conducting devices connected to said one column bus and thus causing the storage elements in said predetermined column to acquire a storage state in accordance with the preparatory voltages applied to the row busses by said read-in circuit means, and read-out means for causing the storage elements of a selected one of the columns to reacquire said initial storage state to produce an output signal in response to storage state changes in the elements of said selected column caused by said read-out means.

25. The combination of elements set forth in claim 24 further including individual output circuit means electrically connected to each of the asymmetrical conducting devices connected to the storage elements of said selected column for receiving said output signal.

26. A memory system comprising a plurality of bistable storage elements operable to either an initial or a second storage state, said storage elements being arranged in an array of rows and columns, a plurality of row busses, a plurality of column busses, individual asymmetrically conducting devices connected electrically in series with each of said storage elements, means for electrically interconnecting different ones of a first group of said serially connected asymmetrically conducting devices and storage elements between one of said row busses and different ones of said column busses and for electrically interconnecting different ones of a second group of said storage elements between a second one of said row busses and different ones of said column busses for establishing a signal flow path fo reach such interconnection, read-in circuit means connected to each of said row busses for applying preparatory voltages thereto for a predetermined period in response to a first signal, which voltages by themselves do not change the storage state of the storage elements, means for selectively applying a selection voltage to a predetermined one of said column busses for establishing current flow through the asymmetrically conducting devices connected to said one column bus and thus causing the storage elements in said predetermined column to acquire a storage state in accordance with the preparatory voltages applied to the row busses by said read-in circuit means, and read-out means for causing each of the storage elements of a selected one of the columns to acquire said initial or said second storage state to produce, on said row busses, an output signal in response to storage state changes in the elements of said selected column caused by said read-out means.

27. A memory system as set forth in claim 26 wherein said storage elements are binary elements.

28. A memory system comprising a plurality of bistable storage elements operable to either an initial or a second storage state, said storage elements being arranged in an array of rows and columns, a plurality of row busses, a plurality of column busses, individual asymmetrically conducting devices connected electrically in series with each of said storage elements, means for electrically interconnecting different ones of a first group of said serially connected asymmetrically conducting devices and storage elements between one of said row busses and different ones of said column busses and for electrically interconnecting different ones of a second group of said storage elements between a second one of said row busses and different ones of said column busses for establishing a signal flow path for each such interconnection, read-in circuit means connected to each of said row busses for applying preparatory voltages thereto for a predetermined period in response to a first signal, which voltages by themselves do not change the storage state of the storage elements, means for selectively applying a selection voltage to a predetermined one of said column busses for establishing current flow through the asymmetrically conducting devices connected to said one column bus and thus causing the storage elements in said predetermined column to acquire a storage state in accordance with the preparatory voltages applied to the row busses by said read-in circuit means, and individual output circuit means connected to each of said row busses for deriving an output signal in accordance with the storage state of the storage elements of respective ones of said rows.

29. In a matrix memory system comprising a plurality of static magnetic storage cores capable of assuming an initial and a second stable state of magnetic remanence, said cores being arranged in an array of rows and columns, means for reading information selectively into selected ones of said storage cores by driving predetermined ones of said selected cores into magnetic saturation in one sense to establish the second stable remanent state in said predetermined cores, comprising just a single read-in winding for each core positioned in electromagnetic coupling relation to each individual one of said cores, and means for reading information out of certain ones of said cores comprising electromagnetic means for driving said certain cores into magnetic saturation in a sense opposite said one sense to cause the ones of said certain cores which are in the second stable remanent state to switch back to the initial remanent state and, by means of this change in remanent state, to produce an output voltage across each of the read-in windings coupled to such switched cores, and output circuit means connected to each of said read-in windings for receiving the output voltage thus produced.

30. A memory system comprising a plurality of storage elements having bistable remanent storage states one of which is a set state and the other of which is a reference state, said memory system including a plurality of column conductive busses and a plurality of row conductive busses and having said storage elements arranged in an array of columns and rows at the intersections of said column and row busses, a plurality of asymmetrically conducting devices each individually connected electrically in series with one of said storage elements, means for electrically interconnecting different ones of a first group of said serially connected asymmetrically conducting devices and storage elements to one of said row busses and different ones of a second group thereof to a second one of said row busses, means for electrically interconnecting said first group of said serially connected asymmetrically conducting devices and storage elements to one of said column busses and for electrically interconnecting said second group thereof to a second one of said column busses, voltage means for pulsing one of said column busses and at least one of said row busses so as to cause the storage elements at the intersections of such row and column busses to assume their set remanent storage state, and read-out means for causing the storage elements of a selected one of the columns to reacquire said reference storage state to produce an output signal in response to storage state changes in the elements of said selected column caused by said read-out means.

31. A memory system comprising a plurality of storage elements having bistable remanent storage states one of which is a set state and the other of which is a reference state, said memory system including a plurality of column conductive busses and a plurality of row conductive busses and having said storage elements arranged in an array of columns and rows at the intersections of said column and row busses, a plurality of asymmetrically conducting devices each individually connected electrically in series with one of said storage elements, means for electrically interconnecting different ones of a first group of said serially connected asymmetrically conducting devices and storage elements to one of said row busses and different ones of a second group thereof to a second one of said row busses, means for electrically interconnecting said first group of said serially connected asymmetrically conducting devices and storage elements to one of said column busses and for electrically interconnecting said second group thereof to a second one of said column busses, voltage means for pulsing one of said column busses and at least one of said row busses so as to cause the storage elements at the intersections of such row and column busses to assume their set remanent storage state, and read-out means for applying interrogating signals to the storage elements of a selected one of the columns at a time distinct from the application of said pulses, said interrogating signals being of sufficient magnitude to cause said storage elements in the selected column to assume said reference remanent state, and gating means coupled to each of the elements of said selected column for delivering output voltages produced when said storage elements in the selected column change their storage state from said set remanent state to said reference remanent state.

References Cited in the file of this patent

UNITED STATES PATENTS

| | | |
|---|---|---|
| 2,146,576 | Haselton et al. | Feb. 7, 1939 |
| 2,614,167 | Kamm | Oct. 14, 1952 |
| 2,717,373 | Anderson | Sept. 6, 1955 |

OTHER REFERENCES

Edvac Progress Report #2, June 30, 1946, pp. 4–22, 4–23, PY–0–164, PY–0–165, Moore School of Engin., Univ. of Pa.

Thesis by M. K. Haynes, Dec. 28, 1950, pp. 21–28.

Journal of Applied Physics, vol. 22, No. 1, Jan. 1951, "Digital Information Storage," Jay W. Forrester, pp. 44–48.